United States Patent [19]
Jaspers

[11] Patent Number: 5,208,661
[45] Date of Patent: May 4, 1993

[54] COLOR PICTURE DISPLAY DEVICE AND COLOR CAMERA

[75] Inventor: Cornelis A. M. Jaspers, Eindhoven, Netherlands

[73] Assignee: U.S. Philips Corporation, New York, N.Y.

[21] Appl. No.: 826,326

[22] Filed: Jan. 24, 1992

[30] Foreign Application Priority Data

Feb. 1, 1991 [NL] Netherlands .......................... 9100174

[51] Int. Cl.$^5$ ................................................ H04N 9/69
[52] U.S. Cl. ....................................... 358/32; 358/27; 358/164
[58] Field of Search .................... 358/32, 31, 30, 164, 358/27

[56] References Cited

U.S. PATENT DOCUMENTS 5,068,718  11/1991  Iwabe .................................. 358/164

FOREIGN PATENT DOCUMENTS 61-220581   9/1986  Japan .
61-281793  12/1986  Japan .
2-166993    6/1990  Japan .
3-155292    7/1991  Japan .

Primary Examiner—Victor R. Kostak
Assistant Examiner—Sherrie Hsia
Attorney, Agent, or Firm—Edward W. Goodman

[57] ABSTRACT

Color picture display device and/or color camera including a controllable gamma arrangement C, C' in which a controlled color correction circuit operating in synchronism with the control of the gamma arrangement is provided. This color correction circuit is preferably constituted by a controlled amplifier device A, A' for controlling the chrominance signals applied to the color picture display device or supplied by the color camera.

4 Claims, 3 Drawing Sheets

COLOR PICTURE DISPLAY DEVICE AND COLOR CAMERA

BACKGROUND OF THE INVENTION

1. Field of the Invention

The invention relates to a color picture display device comprising:

means for applying a color video signal composed of a gamma-precorrected luminance component and gamma-precorrected chrominance components, a matrix circuit for deriving gamma-precorrected primary colour signals from the applied gamma-precorrected luminance and chrominance components, gamma correction means coupled to the matrix circuit for modifying the gamma of the primary color signals, which gamma correction means have a control input for controlling the gamma of the primary color signals in response to a gamma control signal applied to the control input, means for generating said gamma control signal, and a color picture display screen coupled to the gamma correction means for displaying the color picture represented by the gamma-corrected color signals.

2. Description of the Related Art

A device of this type is known, for example, from U.S. Pat. No. 4,489,349.

Conventional color picture display devices have a brightness level control facility with which the user can adjust the brightness of the picture to be displayed. This brightness adjustment is realized by adding an adjustable dc component to the luminance component of the color video signal (or to the primary color signals derived from the luminance component and the chrominance components). However, such a brightness level control has a number of drawbacks:

Not only the grey level values of the video signal but also the peak-white level values are increased when turning up the brightness level. This may lead to unacceptable high white level values so that the video signal must subsequently be limited again to acceptable peak-white level values.

Moreover, the black level of the video signal is raised to a grey level so that the contrast of the displayed picture deteriorates essentially.

Furthermore, an uncolored luminance component is added to the colored parts of the picture. The color saturation is thereby reduced considerably.

A considerable improvement of the picture quality can be obtained by refraining from a brightness level control and by providing instead an adjustable or controllable gamma control which operates on all primary color signals. Such a gamma control can be represented by the formula $S_{out}=S^\gamma_{in}$ in which $S_{in}$ denotes the primary color signal applied to the gamma control as an input signal, with $S_{in}=0$ for black and $S_{in}=1$ for white, and in which $S_{out}$ represents the gamma-corrected output signal. If the exponent $\gamma$ is varied, the output signal $S_{out}$ varies too, but its black level ($S_{out}=0$) and the white level ($S_{out}=1$) are then independent of $\gamma$. It is to be noted that gamma circuits can be used in practice which do not supply an exact exponential gamma but which substantially approximate the function $S_{out}=S^\gamma_{in}$, at least for the relevant signal range.

The adjustable gamma in the picture display device forms part of the overall gamma of the transmission system, ranging from the picked-up image in the camera up to and including the displayed image. Conventional gamma values are: 1/2.2 in the camera and 2.8 in the cathode ray tube so that the overall gamma is 2.8/2.2=1.27 without any variable gamma control. With a gamma being adjustable between, for example 1 and 0.40, the overall gamma varies between 1.27 and 2.8*0.40/2.2=0.51.

However, it has been found that a colour error then occurs. This color error becomes manifest as an error in the color saturation and, to a lesser extent, in the color hue.

SUMMARY OF THE INVENTION

It is, inter alia, an object of the invention to obviate this color error in a color picture display device having an adjustable or controllable gamma or at least to reduce it to a considerable extent. To this end the color picture display device according to the invention is characterized by a color correction circuit for modifying, in response to the gamma control signal, the mutual ratio of the primary color signals either before or after the gamma correction means.

The invention is based on the recognition that the occurring color error is larger as the overall gamma deviates from the value of 1 by a larger amount, so that the color error can be reduced very efficiently for the entire control range by modifying the mutual ratio of the primary color signals in dependence upon the gamma control signal.

It has been found possible to compensate for said color shifts and particularly for the disturbing color shifts of the skin colour hues to a considerable extent and in a very simple manner if the color picture display device according to the invention is further characterized in that the color correction circuit comprises a controllable amplifier device for controlling, in response to the gamma control signal, the amplitude of the gamma-precorrected chrominance components applied to the matrix circuit, a decrease of the gamma being accompanied by an automatic increase of said amplitude.

In a corresponding manner, an adustable or controllable gamma can also be used in the camera, for example, in the hands of the cameraman who can decrease the camera gamma in the case of dark scenes and increase this gamma in the case of brighter scenes. Preferably, the color errors produced by these gamma modifications in the camera are also compensated for in the camera. Consequently, the invention also relates to a color camera comprising:

a sensor device for converting a color picture into a plurality of primary color signals, gamma correction means coupled to the sensor device for converting the primary color signals into gamma-precorrected color signals, which gamma correction means have a control input for controlling the gamma in response to a gamma control signal applied to the control input, means for generating said gamma control signal, a matrix circuit for deriving a gamma-precorrected luminance component and gamma-precorrected chrominance components from the gamma-precorrected color signals, and according to the invention such a camera is characterized by a color correction circuit for modifying, in response to the gamma control signal, the mutual ratio of the primary color signals either before or after the gamma correction means.

In a corresponding manner as in the picture display device, a very simple color correction can be obtained if the camera according to the invention is further characterized in that the color correction circuit comprises a controllable amplifier device for controlling, in response to the gamma control signal, the amplitude of the gamma-precorrected chrominance components supplied by the matrix circuit, a decrease of the gamma being accompanied by an automatic increase of said amplitude.

BRIEF DESCRIPTION OF THE DRAWINGS

These and other aspects of the invention will be described in greater detail with reference to the Figures shown in the drawings, in which.

DESCRIPTION OF THE PREFERRED EMBODIMENT

Figure 1:
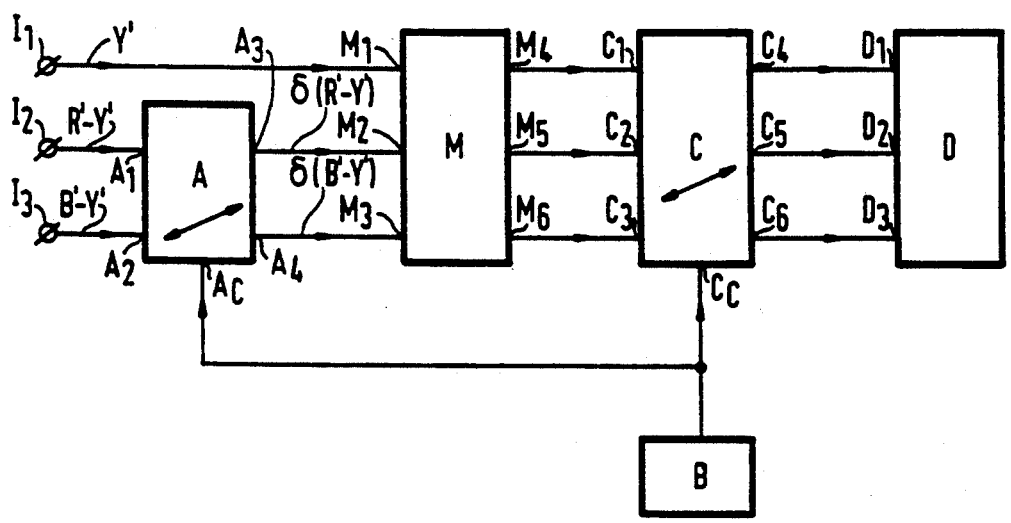
FIG. 1 shows an embodiment of a color picture display device according to the invention.

The color picture display device of FIG. 1 has three input terminals $I_1$, $I_2$ and $I_3$ for the signals Y', R'−Y' and B'−Y', respectively. As is known, Y' is equal to 0.30 R'+0.59 G'+0.11 B', where R', B' and G' represent the primary color signals R, G and B which have been gamma-precorrected in the camera. Y' thus is the gamma-precorrected luminance component and R'−Y' and B'−Y' are the gamma-precorrected chrominance components of the color television signal. The input terminals $I_2$ and $I_3$ are connected to the input terminals $A_1$ and $A_2$ of an amplifier A having output terminals $A_3$ and $A_4$. The input terminal $I_1$ and the output terminals $A_3$ and $A_4$ of the amplifier A are connected to input terminals $M_1$, $M_2$ and $M_3$, respectively, of a matrix circuit M.

It will as yet be assumed that the amplifier A passes the signals without any amplification so that the signals Y', R'−Y' and B'−Y' are applied to the input terminals $M_1$, $M_2$ and $M_3$, respectively, of the matrix circuit. The matrix circuit M is adapted in known manner to convert the three input signals Y', R'−Y' and B'−Y' into the signals R', G' and B' which are available at matrix output terminals $M_4$, $M_5$ and $M_6$, respectively. These signals are subsequently applied to input terminals $C_1$, $C_2$ and $C_3$ of a variable gamma arrangement C whose output terminals $C_4$, $C_5$ and $C_6$ are connected to input terminals $D_1$, $D_2$ and $D_3$ of a color picture display screen, for example, a cathode ray tube or an LCD screen.

In the camera, the signals R', G' and B' are derived from the primary colour signals R, G and B by means of the gamma precorrection $\gamma c$ so that it holds that $R'=R^{\gamma c}$, $G'=G^{\gamma c}$ and $B'=B^{\gamma c}$. Generally, a value of 1/2.2 is used for $\gamma c$. This gamma precorrection serves to compensate at least in part for the gamma ($\gamma d$) of the display screen D. For cathode ray tubes, it is approximately 2.8 and for LCD display screens, it is approximately 3.3. The overall gamma $\gamma t$ ranging from the picked-up image to the displayed image is $\gamma c*\gamma d=2.8/2.2=1.27$ for cathode ray tubes and $3.3/2.2=1.5$ for LCD screens.

As is shown in FIG. 1, a variable gamma arrangement C is arranged in front of the display screen D. This arrangement realizes an additional and variable gamma $\gamma v$ for each primary color signal, which gamma may vary, for example, between 0.4 and 1. The overall gamma $\gamma t=\gamma c*\gamma v*\gamma d$ is then variable between the limits $0.4*2.8/2.2=0.51$ and $1*2.8/2.2=1.27$.

Figure 2:
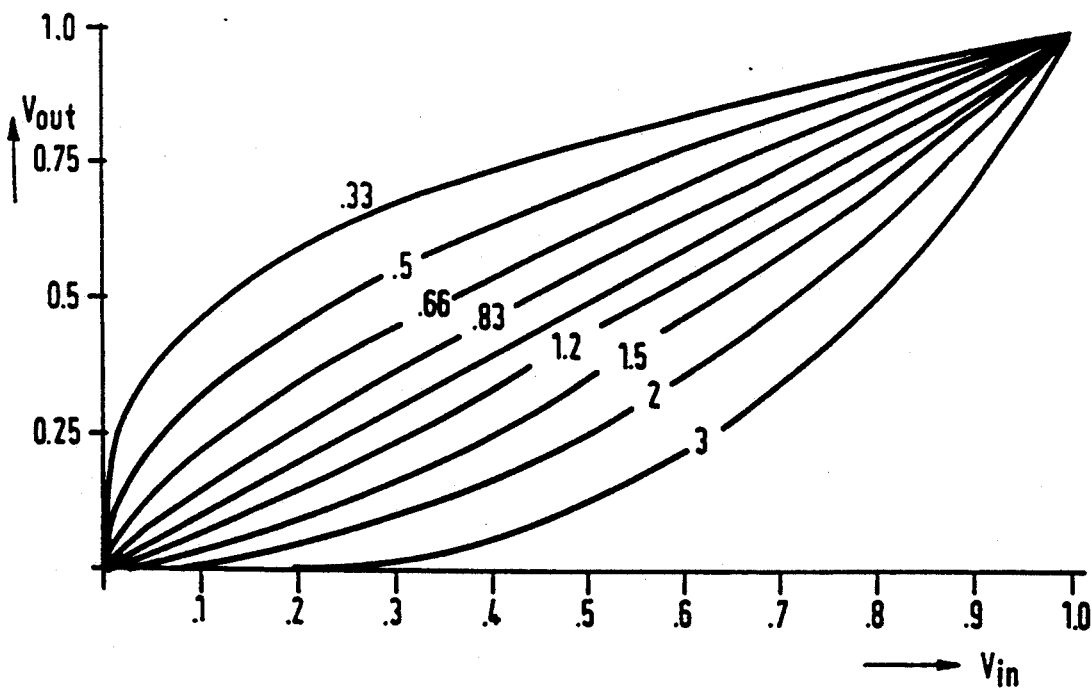
FIGS. 2, 3a and 3b show diagrams to explain the operation of the invention.

FIG. 2 shows the effect of various gammas on the signal. When a purely exponential gamma is used, this Figure shows the relationship between an input signal $V_{in}$ and an output signal $V_{out}=V_{in}{}^\gamma$ for different values of $\gamma$. If $V_{in}$ and $V_{out}$ represent video signals with $V_{in}=0$ for the black level and $V_{in}=1$ for the white level, it appears that the output signal for both black and white remains at black and white, respectively, independent of $\gamma$. However, a decrease of $\gamma$ to, for example 0.5 results in an expansion of the lower (dark) video signal levels and a compression of the higher (brighter) video signal levels, while moreover the average signal level increases so that the overall picture becomes brighter. If the user particularly wants to see more detail in the dark parts of the picture, he will decrease the gamma while maintaining the black and the white level and increasing the average brightness. If he is more interested in the details of the brighter picture parts, he will increase the gamma, which decreases the average brightness.

For the gamma control the variable gamma arrangement C has a gamma control input $C_c$ which is connected to a control signal source B for applying the gamma control signal to the arrangement C. In the source B this control signal is generated in a conventional way, which is not further described, for example manually by means of a hand-held remote control unit, or automatically by measuring the average brightness of the received video signal, as already described in said U.S. Pat. No. 4,489,349.

Figure 3A:
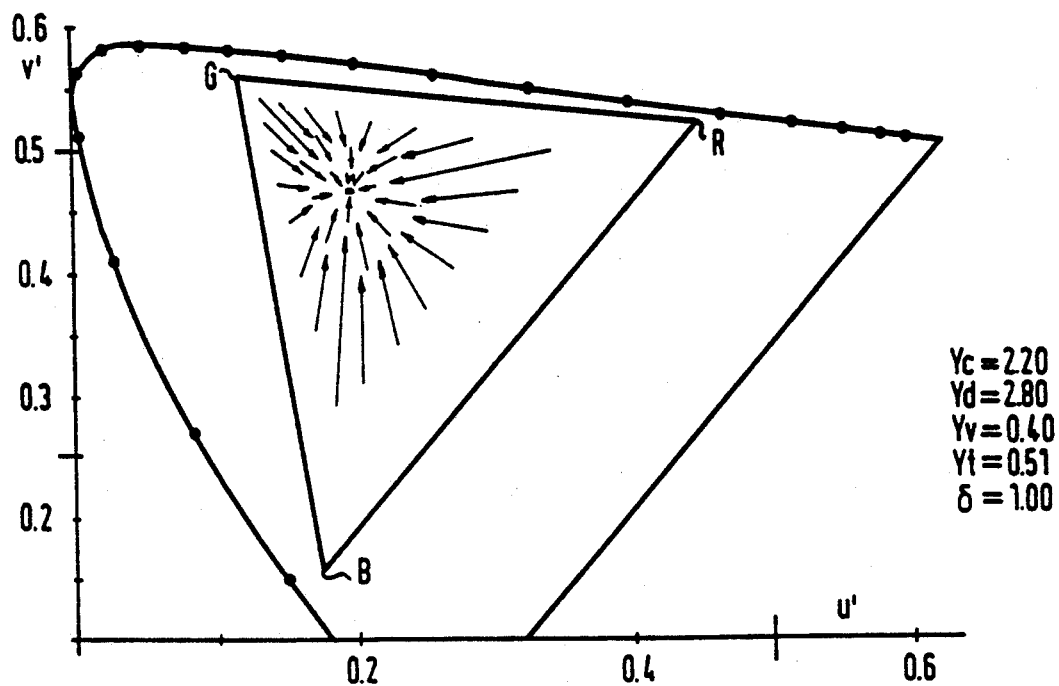

As has already been noted in the opening paragraph, the control of the gamma is found to be accompanied by unwanted color shifts. This is further illustrated in FIG. 3a in which an u',v' chromaticity diagram in accordance with the CIE 1976 standard shows the color shifts which occur when changing the overall gamma $\gamma t$ from 1 to 0.51. The arrows in this diagram represent the color shifts resulting from the gamma control. It can clearly be seen that considerable color shifts occur, notably also in the range of the skin colour hues (flesh-tones) which are very sensitive to color shifts (approximately halfway between the red (R), green (G) and white (W) points).

Figure 3B:
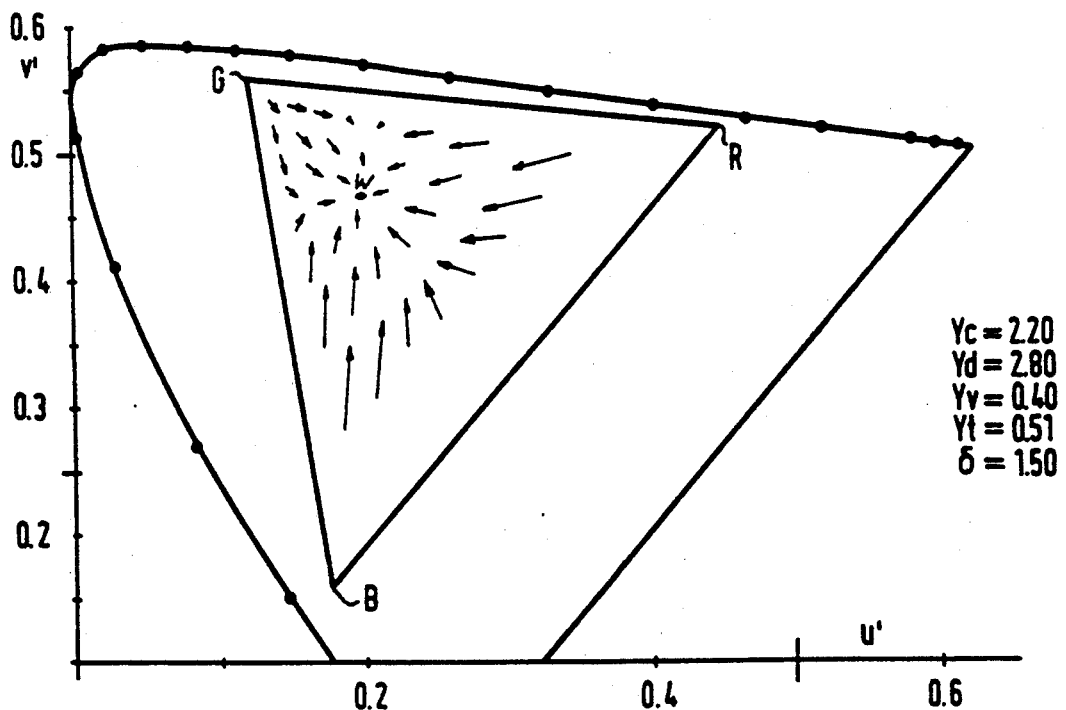

In order to compensate for these shifts, the connections between input terminals $I_2$, $I_3$ and the matrix input terminals $M_2$, $M_3$ incorporate the variable amplifier A which amplifies the chrominance components R'−Y' and B'−Y' in such a way that the amplified R'−Y' signal $\delta(R'-Y')$ occurs at the output $A_3$ and the amplified B'−Y' signal $\delta(B'-Y')$ occurs at the output $A_4$. The amplifier A has a control input $A_c$ via which the gain factor $\delta$ is controllable. This control input receives the same gamma control signal, or a control signal derived therefrom, from the source B. The amplifier A is then controlled in such a way that the gain factor $\delta$ and hence the amplitude of the chrominance components R'−Y' and B'−Y' applied to the matrix circuit increase when the gamma in the arrangement C decreases. For an optimum compensation of the color shifts occurring when the overall gamma is reduced to 0.51, the gain factor $\delta$ of the amplifier A is to increase to approximately 1.5. The remaining color shifts are shown in FIG. 3b. As is apparent from this Figure, a substantially full correction is obtained in the important skin color range with a very simple control with which the two chrominance components $R'-Y'$ and $B'-Y'$ are amplified to an equal extent. It is also to be noted that this color correction control is distinguished from conventional color saturation controls in which the chrominance components are attenuated while for the proposed color correction these components are also amplified.

Figure 4:
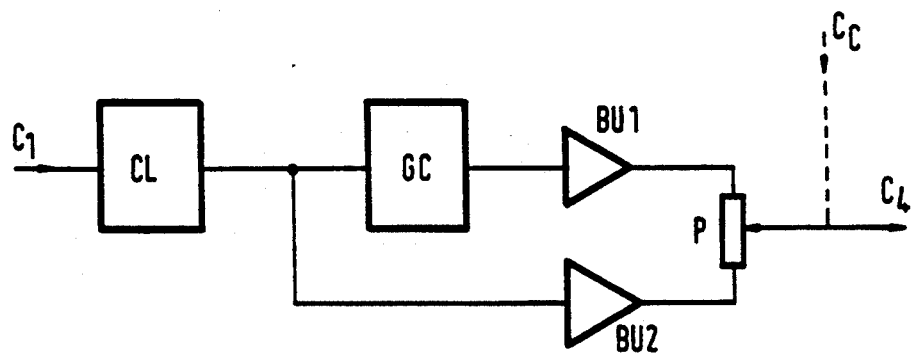
FIG. 4 shows an embodiment of a gamma corrector for use in a gamma correction arrangement as shown in FIG. 1.

The variable gamma correction arrangement C comprises three variable gamma circuits, one for each color signal. A possible embodiment is shown in FIG. 4. The input signal is applied via a clamping circuit CL to a fixed gamma corrector GC having a gamma of, for example 0.4. The gamma corrector GC may be implemented as any known gamma corrector which approximates the desired exponential curve in the relevant signal range to a sufficient extent. The output signal of the gamma corrector is applied to the upper end of an adjustable electronic potentiometer P via a first buffer stage $BU_1$. The signal of the clamping circuit is also applied to the lower end of the electronic potentiometer P via a second buffer $BU_2$. The wiper of the potentiometer forms the output signal of the variable gamma corrector. If the wiper is in its upper position, the output signal is approximately equal to $V_{in}^{0.4}$ and if the wiper is in its lowest position, the output signal is equal to $V_{in}$. In the case of intermediate positions of the wiper, the output signal approximately has a gamma of between 0.4 and 1, dependent on the position of the wiper.

Figure 5:
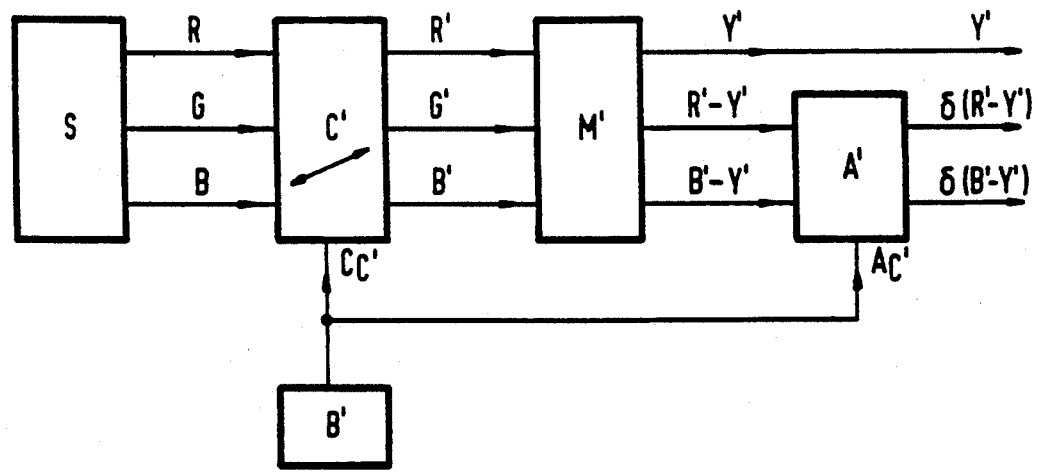
FIG. 5 shows an embodiment of a color camera according to the invention.

In a corresponding manner as is shown in FIG. 1 for a color picture display device, it is possible to use the invention in a color camera. This is shown in FIG. 5.

A sensor device S supplies primary color signals R, G and B to a gamma precorrection arrangement C' having a control input $C'_c$ for controlling the gamma of the arrangement C'. The input signals R, G, B are converted into gamma-precorrected primary color signals R', G' and B' for which it holds that: $R'=R^{\gamma c}$, $G'=G^{\gamma c}$ and $B'=B^{\gamma c}$ and in which $\gamma c$ represents the controllable or adjustable gamma exponent of the arrangement C'.

The output signals R', G' and B' of the arrangement C' are subsequently applied to a matrix circuit M' in which these signals are converted into a gamma-precorrected luminance component Y' and into gamma-procorrected chrominance components $R'-Y'$ and $B'-Y'$. The two chrominance components are subsequently amplitude-controlled in a controllable amplifier A' having a control input $A'_c$ and the two output signals of this amplifier are further processed together with the luminance component Y' in known manner (not shown) for their transmission to display devices.

In a corresponding manner as in FIG. 1, the controllable gamma precorrection arrangement C' and the controllable amplifier A' are jointly controlled at their respective control inputs $C'_c$ and $A'_c$ by a control signal source B', such that color shifts caused by the gamma control of the arrangement C' are mainly compensated for by the control of the amplifier A'. Similarly as in the picture display device, the amplification of the gamma-precorrected chrominance components is to be increased when the gamma decreases.

It is to be noted that the color correction circuit may be implemented in a different way than is described with reference to FIGS. 1 and 5. The variable gain factor $\delta$ may be, for example, slightly different for the signals $R'-Y'$ and $B'-Y'$. It is also possible for the color correction to operate on the output signals of the matrix circuit M or on the input signals of the matrix circuit M'. In that case not only a variable amplification but also a further signal matrixing is necessary for a satisfactory color correction. For example, in FIG. 1 the same color correction can be obtained if, instead of the controllable amplifier A, the output signals R', G' and B' of the matrix circuit M are converted into controlled signals $\delta R'$, $\delta G'$ and $\delta B'$ and if a controlled luminance signal $(1-\delta)Y'$ is subsequently added to these signals. An additional signal matrixing will generally appear to be also necessary if the color correction circuit is arranged behind the controllable gamma arrangement C, or if it precedes the controllable gamma arrangement C'.

I claim:

1. A color picture display device comprising:
   means for receiving a color video signal composed of a gamma-precorrected luminance component and gamma-precorrected chrominance components;
   a matrix circuit for deriving gamma-precorrected primary color signals from the received gamma-precorrected luminance and chrominance components;
   gamma correction means coupled to the matrix circuit for modifying the gamma of the primary color signals, said gamma correction means having a control input for controlling the gamma of the primary color signals in response to a gamma control signal applied to the control input;
   means for generating said gamma control signal; and
   a color picture display screen coupled to the gamma correction means for displaying the color picture represented by the gamma-corrected color signals, characterized in that said picture displaying device further comprises:
   a color correction circuit for modifying, in response to the gamma control signal, the mutual ratio of the primary color signals either before or after the gamma correction means.

2. A color picture display device as claimed in claim 1, characterized in that the color correction circuit comprises a controllable amplifier device for controlling, in response to the gamma control signal, the amplitude of the gamma-precorrected chrominance components applied to the matrix circuit, a decrease of the gamma being accompanied by an automatic increase of said amplitude.

3. A color camera comprising:
   a sensor device for converting a color picture into a plurality of primary color signals;
   gamma correction means coupled to the sensor device for converting the primary color signals into gamma-precorrected color signals, said gamma correction means having a control input for controlling the gamma in response to a gamma control signal applied to the control input;
   means for generating said gamma control signal; and
   a matrix circuit for deriving a gamma-precorrected luminance component and gamma-precorrected chrominance components from the gamma-precorrected color signals, characterized in that said color camera further comprises:
   a color correction circuit for modifying, in response to the gamma control signal, the mutual ratio of the primary color signals either before or after the gamma correction means.

4. A color camera as claimed in claim 3, characterized in that the color correction circuit comprises a controllable amplifier device for controlling, in response to the gamma control signal, the amplitude of the gamma-precorrected chrominance components supplied by the matrix circuit, a decrease of the gamma being accompanied by an automatic increase of said amplitude.

* * * * *